US012318347B2

(12) United States Patent
Liu

(10) Patent No.: US 12,318,347 B2
(45) Date of Patent: Jun. 3, 2025

(54) INDOOR NAVIGATION ROBOT FOR BLIND PERSON

(71) Applicant: Lirui Liu, Shanghai (CN)

(72) Inventor: Lirui Liu, Shanghai (CN)

( * ) Notice: Subject to any disclaimer, the term of this patent is extended or adjusted under 35 U.S.C. 154(b) by 88 days.

(21) Appl. No.: 18/219,113

(22) Filed: Jul. 7, 2023

(65) Prior Publication Data
US 2025/0009591 A1    Jan. 9, 2025

(51) Int. Cl.
*A61H 3/06* (2006.01)
*G05D 1/00* (2024.01)

(52) U.S. Cl.
CPC .......... *A61H 3/061* (2013.01); *G05D 1/0214* (2013.01); *G05D 1/0238* (2013.01); *A61H 2201/5012* (2013.01)

(58) Field of Classification Search
None
See application file for complete search history.

(56) References Cited

U.S. PATENT DOCUMENTS

| 2015/0324646 A1* | 11/2015 | Kimia | G01C 21/3602 |
| 2019/0375094 A1* | 12/2019 | Kim | B25J 11/008 |
| 2020/0195837 A1* | 6/2020 | Miu | H04N 23/67 |

FOREIGN PATENT DOCUMENTS

CN    106890067 B    5/2019

* cited by examiner

*Primary Examiner* — Thomas S McCormack
(74) *Attorney, Agent, or Firm* — Bayramoglu Law Offices LLC

(57) ABSTRACT

An indoor navigation robot for a blind person includes a data acquisition module, a central processing module, and an intelligent terminal. The indoor navigation robot acquires and processes position data, speed data and acceleration data of a fixed obstacle, a moving obstacle, and a pedestrian. The indoor navigation robot fully considers the mobility of people indoors and the accidental mobility of obstacles indoors. Based on this, the indoor navigation robot detects the position of the fixed obstacle, plans the initial walking route of the blind person, detects the position data, the speed data, and the acceleration data of people and moving obstacles in various directions indoors, and plans the walking route of the blind person for many times. The indoor navigation robot improves the accuracy of analysis and detection of indoor conditions, and can prompt the blind person to make emergency avoidance in a timely manner.

8 Claims, 2 Drawing Sheets

INDOOR NAVIGATION ROBOT FOR BLIND PERSON

TECHNICAL FIELD

The present disclosure relates to the technical field of navigation robots, and in particular to an indoor navigation robot for a blind person.

BACKGROUND

In robot navigations, a robot determines its position in a frame of reference and plans a route to a target position. To achieve the purpose of navigation, the robot or any other mobile device requires a form of representation, that is, an environmental map, and the ability to interpret the form of representation.

Chinese patent CN106890067B discloses an indoor navigation robot for a blind person, including two parts, namely, a navigation robot and a wearable mobile terminal. The navigation robot includes a camera module, a walking module, a central control unit, a human-machine interaction module, a prompt module, and a wireless communication module. The wearable mobile terminal includes a voice module, an acceleration sensor, and a wireless communication module. The navigation robot communicates with the wearable mobile terminal through the wireless communication module, acquires a three-dimensional (3D) environmental map through the camera module, and matches the 3D environmental map with an indoor 3D scene map to derive a current position, such that the robot can detect and avoid obstacles and monitor the position of the blind user during navigation. Moreover, the navigation robot can adjust the motion state of the walking module to avoid deviation from the navigation route. The navigation robot can acquire the destination of the blind user through the voice module or the human-machine interaction module to plan the route, and prompt the blind user in real time to change the direction and avoid the obstacles. The indoor navigation robot features convenient use, high positioning accuracy, strong obstacle avoidance ability, wide application prospect, etc.

However, the indoor navigation robot only combines traditional identification modules and has low accuracy of analysis and detection of indoor conditions, making it unsuitable to provide emergency avoidance prompts for the blind user in emergency situations.

SUMMARY

An objective of the present disclosure is to provide an indoor navigation robot for a blind person to solve the problem described in BACKGROUND.

To solve the above technical problem, the present disclosure provides the following technical solution. An indoor navigation robot for a blind person includes a data acquisition module, a central processing module, and an intelligent terminal, where the data acquisition module and the intelligent terminal are separately in communication connection with the central processing module; the data acquisition module is configured to acquire position data, speed data, and acceleration data; the central processing module performs data analysis and integration, and the intelligent terminal is configured to perform data reception and transmission and provide instruction information to the blind person.

Further, the data acquisition module establishes a spatial coordinate system and acquires the following data in the spatial coordinate system: position data $(X_{ai}, Y_{ai}, Z_{ai})$ of a fixed obstacle, position data $(X_{bi}, Y_{bi}, Z_{bi})$ of a moving obstacle, position data $(X_{ci}, Y_{ci}, Z_{ci})$ of a pedestrian, position data $(X_{di}, Y_{di}, Z_{di})$ of the blind person, speed data $E_{bi}$ of the moving obstacle, speed data $E_{ci}$ of the pedestrian, speed data $E_{di}$ of the blind person, acceleration data $F_{bi}$ of the moving obstacle, acceleration data $F_{ci}$ of the pedestrian, and acceleration data $F_{di}$ of the blind person, where i denotes real-time data, a denotes a representation number of the fixed obstacle, b denotes a representation number of the moving obstacle, c denotes a representation number of the pedestrian, and d denotes a designated representation symbol of the blind person; and the data acquisition module further transmits the acquired data to the central processing module.

Further, the central processing module performs data analysis and integration to acquire the following data: in case of a same flat surface indoors:

a distance between the fixed obstacle and the blind person: $G_{ai}$, where $G_{ai} = \sqrt{(X_{ai}-X_{di})^2+(Y_{ai}-Y_{di})^2}$;

a distance between the moving obstacle and the blind person: $G_{bi}$, where $G_{bi} = \sqrt{(X_{bi}-X_{di})^2+(Y_{bi}-Y_{di})^2}$; and a distance between the pedestrian and the blind person: $G_{ci}$, where $G_{ci} = \sqrt{(X_{ci}-X_{di})^2+(Y_{ci}-Y_{di})^2}$; and in case of different flat surfaces indoors:

a distance between the fixed obstacle and the blind person: $H_{ai}$, where $H_{ai} = \sqrt{(X_{ai}-X_{di})^2+(Y_{ai}-Y_{di})^2+(Z_{ai}-Z_{di})^2}$;

a distance between the moving obstacle and the blind person: $H_{bi}$, where $H_{bi} = \sqrt{(X_{bi}-X_{di})^2+(Y_{bi}-Y_{di})^2+(Z_{bi}-Z_{di})^2}$; and a distance between the pedestrian and the blind person: $H_{ci}$, where $H_{ci} = \sqrt{(X_{ci}-X_{di})^2+(Y_{ci}-Y_{di})^2+(Z_{ci}-Z_{di})^2}$; and a safe distance is set as P, and P is twice a shoulder width of the blind person to create a sufficient emergency response time for the blind person, further ensuring the safety of the blind person.

Further, the central processing module initially plans a real-time walking route of the blind person according to an initial planning condition, that is, the position coordinates $(X_{di}, Y_{di}, Z_{di})$ of the blind person on the real-time walking route satisfies:

$$P < \min_{a=1,i=1}(G_{ai}), P < \min_{a=1,i=1}(H_{ai});$$

the distance between the real-time position of the blind person and the position of the fixed obstacle is greater than the safe distance P; and this ensures that the initially planned real-time walking route of the blind person completely avoids the fixed obstacle.

Further, the central processing module secondarily plans the real-time walking route of the blind person based on the initially planned real-time walking route according to two conditions; in a first condition, $$P < \min_{b=1,i=1}(G_{bi}), P < \min_{c=1,i=1}(G_{ci}), P < \min_{b=1,i=1}(H_{bi}), \text{ and } P < \min_{c=1,i=1}(H_{ci});$$

the distance between the real-time position of the blind person and the position of the fixed obstacle, the position of the moving obstacle or the position of the pedestrian is greater than the safe distance P; and therefore, the secondarily planned real-time walking route of the blind person completely avoids the fixed obstacle, the moving obstacle, and the pedestrian on the same flat surface or on different flat surfaces;

in a second condition, when $$2P \geq \min_{b=1,i=1}(G_{bi}), 2P \geq \min_{c=1,i=1}(G_{ci}), 2P \geq \min_{b=1,i=1}(H_{bi}), \text{ and } 2P \geq \min_{c=1,i=1}(H_{ci}),$$

K is calculated; and $$K = \frac{G_{bi+1} - G_{bi}}{G_{bi}} \times \frac{G_{ci+1} - G_{ci}}{G_{ci}} \times \frac{H_{bi+1} - H_{bi}}{H_{bi}} \times \frac{H_{ci+1} - H_{ci}}{H_{ci}};$$

when K≥0, there is no need to prompt the blind person to make emergency avoidance, and the blind person walks along the real-time walking route as planned; and when K<0, the blind person is prompted through the intelligent terminal to make emergency avoidance in advance and adjust the walking speed $E_{di}$ and acceleration $F_{di}$, such that $E_{di}+F_{di} \geq E_{ci}+F_d$ and $E_{di}+F_{di} \geq E_{bi}+F_{bi}$.

Further, after the adjustment, K is recalculated; when K≥0, the blind person is prompted that the emergency avoidance in advance is correct and the emergency avoidance is supposed to continue; when $$2P < \min_{b=1,i=1}(G_{bi}), 2P < \min_{c=1,i=1}(G_{ci}), 2P < \min_{b=1,i=1}(H_{bi}), \text{ and } 2P < \min_{c=1,i=1}(H_{ci}),$$

the blind person is prompted through the intelligent terminal that the emergency avoidance is successful; when K<0, the blind person is prompted through the intelligent terminal that the emergency avoidance is incorrect and the blind person is supposed to accelerate; and K is recalculated;

K is recalculated; when K≥0, the blind person is prompted through the intelligent terminal that the emergency avoidance in advance is correct and the emergency avoidance is supposed to continue; when $$2P < \min_{b=1,i=1}(G_{bi}), 2P < \min_{c=1,i=1}(G_{ci}), 2P < \min_{b=1,i=1}(H_{bi}), \text{ and } 2P < \min_{c=1,i=1}(H_{ci}),$$

the blind person is prompted through the intelligent terminal that the emergency avoidance is successful and the blind person is supposed to decelerate and walk normally; when K<0, the blind person is prompted through the intelligent terminal that the emergency avoidance is incorrect and the blind person is supposed to turn and walk without changing the walking speed; and K is recalculated.

K is recalculated; when K≥0, the blind person is prompted through the intelligent terminal that the emergency avoidance in advance is correct and the emergency avoidance is supposed to continue; and when $$2P < \min_{b=1,i=1}(G_{bi}), 2P < \min_{c=1,i=1}(G_{ci}), 2P < \min_{b=1,i=1}(H_{bi}), \text{ and } 2P < \min_{c=1,i=1}(H_{ci}),$$

the blind person is prompted through the intelligent terminal that the emergency avoidance is successful and the blind person is supposed to decelerate and walk normally.

Further, the indoor navigation robot further includes a cloud platform, where the data acquisition module, the central processing module, and the intelligent terminal are separately in communication connection with the cloud platform; the cloud platform includes a database, and the cloud platform is configured to perform comprehensive management on data of the navigation robot through a remote cloud; and the database is configured to perform data storage.

Further, the data acquisition module includes a position data acquisition unit, a speed data acquisition unit, an acceleration data acquisition unit, and a video data acquisition unit, where the position data acquisition unit is configured to acquire the position data of the fixed obstacle, the moving obstacle, and the pedestrian; the speed data acquisition unit is configured to acquire and process the speed data of the moving obstacle and the pedestrian; the acceleration data acquisition unit is configured to acquire and process the acceleration data of the moving obstacle and the pedestrian; and the video data acquisition unit is configured to acquire and process video data around the blind person.

Further, the central processing module includes a data reception and transmission unit, a data integration unit, and a data analysis unit, where the data reception and transmission unit is configured to perform data reception and transmission, and to transmit data of the navigation robot and the intelligent terminal; the data integration unit is configured to perform data integration; and the data analysis unit is configured to perform data analysis.

Further, the intelligent terminal includes a voice prompt unit, where the voice prompt unit is a bone conduction headphone.

Compared with the prior art, the present disclosure has the following beneficial effects.

1. The present disclosure is provided with the data acquisition module, the central processing module, and the intelligent terminal. The present disclosure acquires and processes the position data of the fixed obstacle, the moving obstacle, and the pedestrian, the speed data of the moving obstacle and the pedestrian, and the acceleration data of the moving obstacle and the pedestrian. The present disclosure fully considers the mobility of people indoors and the accidental mobility of obstacles indoors. Based on this, the present disclosure detects the position of the fixed obstacle, plans the initial walking route of the blind person, detects the position data, the speed data, and the acceleration data of people and moving obstacles in various directions indoors, predicts the route of people, and re-plans the walking route of the blind person. The present disclosure guides the blind person to walk at a constant speed under normal circumstances, and guides the blind person to accelerate walking in emergency avoidance situations. In addition, the present disclosure can also adjust the emergency avoidance route of the blind person, effectively preventing the blind person from failing to respond in a timely or early manner in emergency situations.

2. The present disclosure sets a safe distance for the blind person, which ensures a sufficient emergency time and further ensures the safety of the blind person. The present disclosure sets the initial planning condition for the real-time walking route of the blind person, such that the distance between the real-time position of the blind person and the position of the fixed obstacle is greater than the safe distance P, ensuring that the initially planned real-time walking route of the blind person completely avoids the fixed obstacle. The present disclosure secondarily plans the real-time walking route of the blind person in an actual indoor scene, and sets the planning condition to ensure that the distance between the real-time position of the blind person and the position of the fixed obstacle, the moving obstacle or the pedestrian is greater than the safe distance P. The secondarily planned real-time walking route of the blind person completely avoids the fixed obstacle, the moving obstacle, and the pedestrian on the same flat surface or on different flat surfaces. When the distance between the moving obstacle or the pedestrian and the blind person is less than double safe distances, the present disclosure performs analysis and calculation to prompt the blind person to make emergency avoidance in advance. The present disclosure improves the accuracy of analysis and detection of indoor conditions, and can prompt the blind person to make emergency avoidance in a timely manner. The present disclosure sets, analyzes, adjusts, and determines the emergency avoidance of the blind person, effectively preventing the blind person from failing to respond in a timely or early manner in emergency situations.

BRIEF DESCRIPTION OF THE DRAWINGS

The drawings are intended to provide a further understanding of the present disclosure, constitute a part of the specification, and are intended to explain the present disclosure together with the examples of the present disclosure, which do not constitute a limitation to the present disclosure. Drawings.

Figure 1:
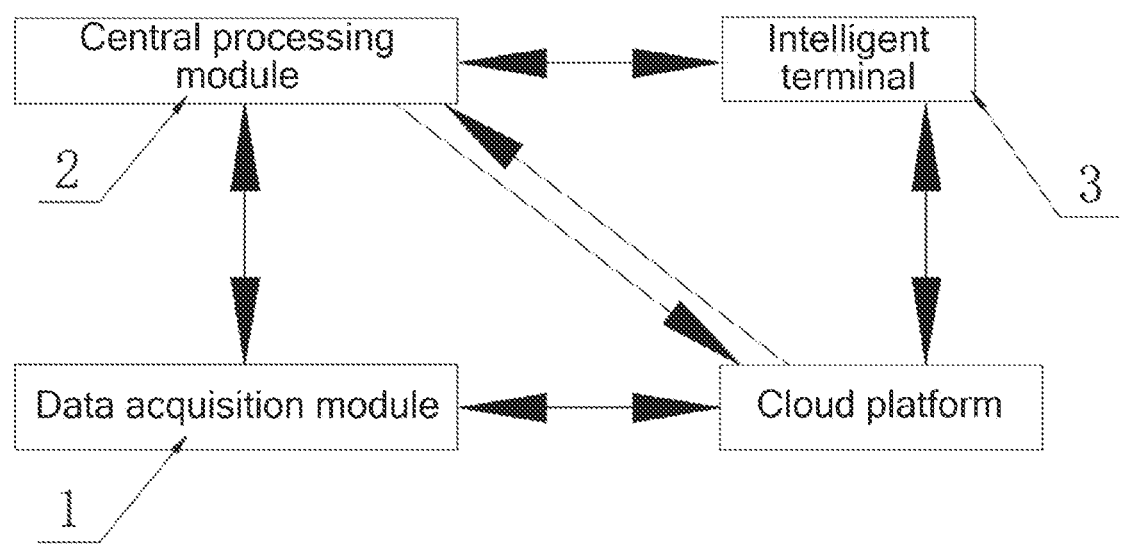
FIG. 1 is a block diagram of an indoor navigation robot for a blind person according to the present disclosure.

Reference Numerals: 1. data acquisition module; 2. central processing module; and 3. intelligent terminal.

DETAILED DESCRIPTION OF THE EMBODIMENTS

The technical solutions of the embodiments of the present disclosure are clearly and completely described below with reference to the drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 2:
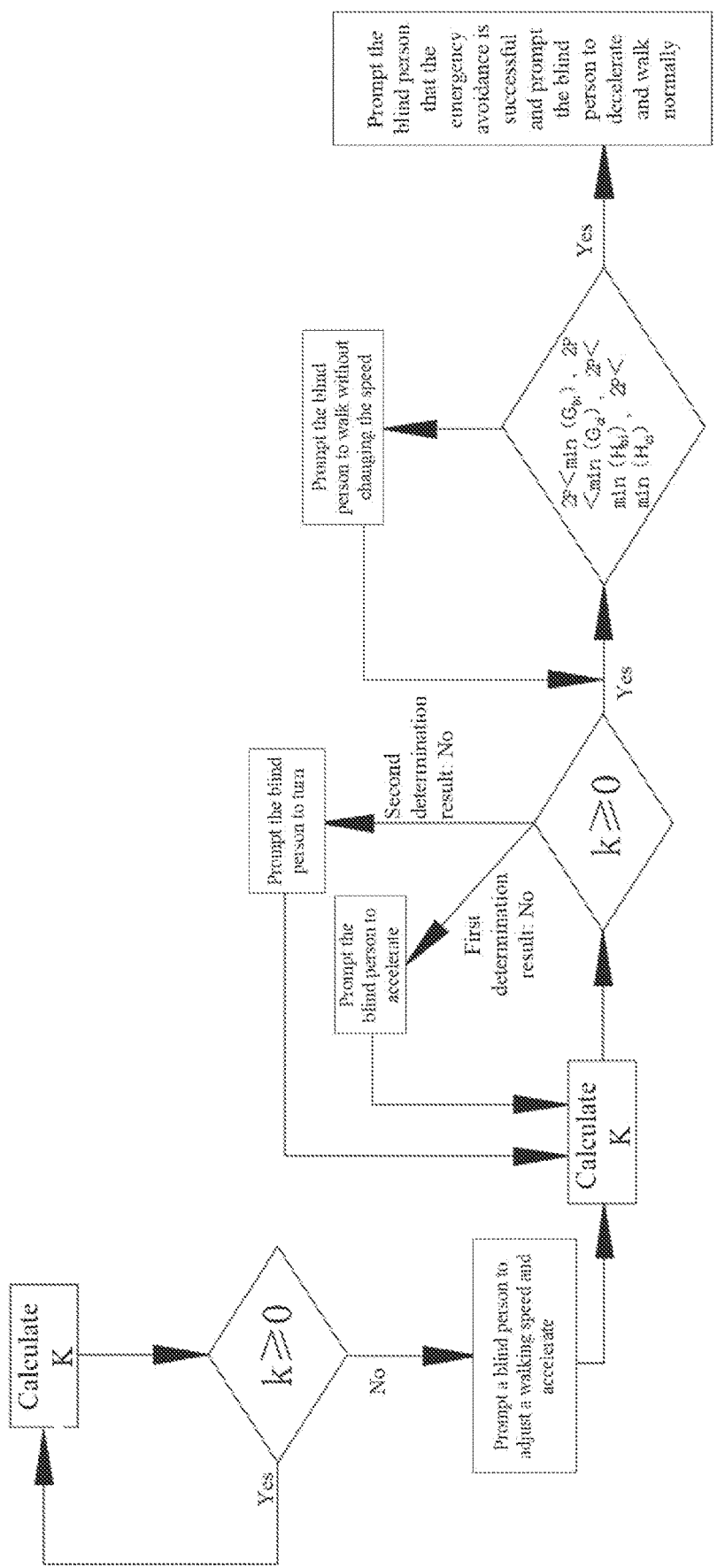
FIG. 2 is a schematic diagram of a working principle of the indoor navigation robot for a blind person according to the present disclosure.

Referring to FIGS. 1 and 2, the present disclosure provides the following technical solution. An indoor navigation robot for a blind person includes data acquisition module 1, central processing module 2, and intelligent terminal 3. The data acquisition module 1 and the intelligent terminal 3 are separately in communication connection with the central processing module 2. The data acquisition module 1 is configured to acquire position data, speed data, and acceleration data. The central processing module 2 is configured to perform data analysis and integration. The intelligent terminal 3 is configured to perform data reception and transmission and provide instruction information to the blind person. The indoor navigation robot further includes a cloud platform. The data acquisition module 1, the central processing module 2, and the intelligent terminal 3 are separately in communication connection with the cloud platform. The cloud platform includes a database, and the cloud platform is configured to perform comprehensive management on data of the navigation robot through a remote cloud. The database is configured to perform data storage. The data acquisition module 1 includes a position data acquisition unit, a speed data acquisition unit, an acceleration data acquisition unit, and a video data acquisition unit. The position data acquisition unit is configured to acquire position data of a fixed obstacle, a moving obstacle, and a pedestrian. The speed data acquisition unit is configured to acquire and process speed data of the moving obstacle and the pedestrian. The acceleration data acquisition unit is configured to acquire and process acceleration data of the moving obstacle and the pedestrian. The video data acquisition unit is configured to acquire and process video data around the blind person. The central processing module 2 includes a data reception and transmission unit, a data integration unit, and a data analysis unit. The data reception and transmission unit is configured to perform data reception and transmission, and to transmit data of the navigation robot and the intelligent terminal 3. The data integration unit is configured to perform data integration. The data analysis unit is configured to perform data analysis. The intelligent terminal 3 includes a voice prompt unit. The voice prompt unit is a bone conduction headphone.

A working process of the indoor navigation robot is as follows.

S1. The data acquisition module 1 establishes a spatial coordinate system and acquires the following data in the spatial coordinate system: the position data $(X_{ai}, Y_{ai}, Z_{ai})$ of the fixed obstacle, the position data $(X_{bi}, Y_{bi}, Z_{bi})$ of the moving obstacle, the position data $(X_{ci}, Y_{ci}, Z_{ci})$ of the pedestrian, the position data $(X_{di}, Y_{di}, Z_{di})$ of the blind person, the speed data $E_{bi}$ of the moving obstacle, the speed data $E_{ci}$ of the pedestrian, the speed data $E_{di}$ of the blind person, the acceleration data $F_{bi}$ of the moving obstacle, the acceleration data $F_{ci}$ of the pedestrian, and the acceleration data $F_{di}$ of the blind person. i denotes real-time data, a denotes a representation number of the fixed obstacle, b denotes a representation number of the moving obstacle, c denotes a representation number of the pedestrian, and d denotes a designated representation symbol of the blind person. Therefore, $(X_{ai}, Y_{ai}, Z_{ai})$ denotes the position data of an a-th fixed obstacle at time i, $(X_{bi}, Y_{bi}, Z_{bi})$ denotes the position data of a b-th moving obstacle at the time i, $(X_{ci}, Y_{ci}, Z_{ci})$ denotes the position data of a c-th pedestrian at the time i, $(X_{di}, Y_{di}, Z_{di})$ denotes the position data of the blind person at the time i, $E_{bi}$ denotes the speed of the b-th moving obstacle at the time i, $E_{ci}$ denotes the speed of the c-th pedestrian at the time i, and $E_{di}$ denotes the speed of the blind person at the time i, $F_{bi}$ denotes the acceleration of the b-th moving obstacle at the time i, $F_{ci}$ denotes the acceleration of the c-th pedestrian at the time i, and $F_{di}$ denotes the acceleration of the blind person at the time i. The acquired data are transmitted to the central processing module 2.

S2. The central processing module 2 performs data analysis and integration to acquire the following data: in case of a same flat surface indoors:

a distance between the fixed obstacle and the blind person: $G_{ai}$, where $G_{ai} = \sqrt{(X_{ai}-X_{di})^2+(Y_{ai}-Y_{di})^2}$;

a distance between the moving obstacle and the blind person: $G_{bi}$, where $G_{bi} = \sqrt{(X_{bi}-X_{di})^2+(Y_{bi}-Y_{di})^2}$; and a distance between the pedestrian and the blind person: $G_{ci}$, where $G_{ci} = \sqrt{(X_{ci}-X_{di})^2+(Y_{ci}-Y_{di})^2}$; and in case of different flat surfaces indoors:

a distance between the fixed obstacle and the blind person: $H_{ai}$, where $H_{ai} = \sqrt{(X_{ai}-X_{di})^2+(Y_{ai}-Y_{di})^2+(Z_{ai}-Z_{di})^2}$;

a distance between the moving obstacle and the blind person: $H_{bi}$, where $H_{bi} = \sqrt{(X_{bi}-X_{di})^2+(Y_{bi}-Y_{di})^2+(Z_{bi}-Z_{di})^2}$; and a distance between the pedestrian and the blind person: $H_{ci}$, where $H_{ci} = \sqrt{(X_{ci}-X_{di})^2+(Y_{ci}-Y_{di})^2+(Z_{ci}-Z_{di})^2}$.

A safe distance is set as P, and P is twice a shoulder width of the blind person to create a sufficient emergency response time for the blind person, further ensuring the safety of the blind person.

S3. The central processing module 2 initially plans a real-time walking route of the blind person according to an initial planning condition, that is, the position coordinates $(X_{di}, Y_{di}, Z_{di})$ of the blind person on the real-time walking route satisfies:

$$P < \min_{a=1, i=1}(G_{ai}) \text{ and } P < \min_{a=1, i=1}(H_{ai}).$$

The distance between the real-time position of the blind person and the position of the fixed obstacle is greater than the safe distance P. This ensures that the initially planned real-time walking route of the blind person completely avoids the fixed obstacle.

S4. The central processing module 2 secondarily plans the real-time walking route of the blind person based on the initially planned real-time walking route according to two conditions; and in a first condition,), $$P < \min_{b=1, i=1}(G_{bi}), P < \min_{c=1, i=1}(G_{ci}), P < \min_{b=1, i=1}(H_{bi}), \text{ and } P < \min_{c=1, i=1}(H_{ci}).$$

The distance between the real-time position of the blind person and the position of the fixed obstacle, the position of the moving obstacle or the position of the pedestrian is greater than the safe distance P. Therefore, the secondarily planned real-time walking route of the blind person completely avoids the fixed obstacle, the moving obstacle, and the pedestrian on the same flat surface or on different flat surfaces.

The secondary planning may satisfy a second condition. When $$2P \geq \min_{b=1, i=1}(G_{bi}), 2P \geq \min_{c=1, i=1}(G_{ci}), 2P \geq \min_{b=1, i=1}(H_{bi}), \text{ and } 2P \geq \min_{c=1, i=1}(H_{ci}),$$

K is calculated.

$$K = \frac{G_{bi+1} - G_{bi}}{G_{bi}} \times \frac{G_{ci+1} - G_{ci}}{G_{ci}} \times \frac{H_{bi+1} - H_{bi}}{H_{bi}} \times \frac{H_{ci+1} - H_{ci}}{H_{ci}}.$$

When K≥0, there is no need to prompt the blind person to make emergency avoidance, and the blind person walks along the real-time walking route as planned. When K<0, the blind person is prompted through the intelligent terminal 3 to make emergency avoidance in advance and adjust the walking speed $E_{di}$ and acceleration $F_{di}$, such that $E_{di} + F_{di} \geq E_{ci} + F_{ci}$ and $E_{di} + F_{di} \geq E_{bi} + F_{bi}$.

After the adjustment, K is recalculated. When K≥0, the blind person is prompted that the emergency avoidance in advance is correct and the emergency avoidance is supposed to continue. When $$2P < \min_{b=1, i=1}(G_{bi}), 2P < \min_{c=1, i=1}(G_{ci}), 2P < \min_{b=1, i=1}(H_{bi}), \text{ and } 2P < \min_{c=1, i=1}(H_{ci}),$$

the blind person is prompted through the intelligent terminal 3 that the emergency avoidance is successful. When K<0, the blind person is prompted through the intelligent terminal 3 that the emergency avoidance is incorrect and the blind person is supposed to accelerate. Then K is recalculated.

K is recalculated. When K≥0, the blind person is prompted through the intelligent terminal 3 that the emergency avoidance in advance is correct and the emergency avoidance is supposed to continue.

$$2P < \min_{b=1, i=1}(G_{bi}), 2P < \min_{c=1, i=1}(G_{ci}), 2P < \min_{b=1, i=1}(H_{bi}), \text{ and } 2P < \min_{c=1, i=1}(H_{ci}),$$

the blind person is prompted through the intelligent terminal 3 that the emergency avoidance is successful and the blind person is supposed to decelerate and walk normally. When K<0, the blind person is prompted through the intelligent terminal 3 that the emergency avoidance is incorrect and the blind person is supposed to turn and walk without changing the walking speed. Then K is recalculated.

K is recalculated. When K≥0, the blind person is prompted through the intelligent terminal 3 that the emergency avoidance in advance is correct and the emergency avoidance is supposed to continue. When $$2P < \min_{b=1, i=1}(G_{bi}), 2P < \min_{c=1, i=1}(G_{ci}), 2P < \min_{b=1, i=1}(H_{bi}), \text{ and } 2P < \min_{c=1, i=1}(H_{ci}),$$

the blind person is prompted through the intelligent terminal 3 that the emergency avoidance is successful and the blind person is supposed to decelerate and walk normally.

The working principle of the present disclosure is as follows:

Referring to FIGS. 1 and 2, the present disclosure is provided with the data acquisition module 1, the central processing module 2, and the intelligent terminal 3. The present disclosure acquires and processes the position data of the fixed obstacle, the moving obstacle, and the pedestrian, the speed data of the moving obstacle and the pedestrian, the acceleration data of the moving obstacle and the pedestrian, and the video data around the blind person. The present disclosure sets a safe distance for the blind person, which ensures a sufficient emergency time and further ensures the safety of the blind person. The present disclosure sets the initial planning condition for the real-time walking route of the blind person, such that the distance between the real-time position of the blind person and the position of the fixed obstacle is greater than the safe distance P, ensuring that the initially planned real-time walking route of the blind person completely avoids the fixed obstacle. The present disclosure secondarily plans the real-time walking route of the blind person in an actual indoor scene, and sets the planning condition to ensure that the distance between the real-time position of the blind person and the position of the fixed obstacle, the moving obstacle or the pedestrian is greater than the safe distance P. The secondarily planned real-time walking route of the blind person completely avoids the fixed obstacle, the moving obstacle, and the pedestrian on the same flat surface or on different flat surfaces. When the distance between the moving obstacle or the pedestrian and the blind person is less than double safe distances, the present disclosure performs analysis and calculation to prompt the blind person to make emergency avoidance in advance. The present disclosure improves the accuracy of analysis and detection of indoor conditions, and can prompt the blind person to make emergency avoidance in a timely manner. The present disclosure sets, analyzes, adjusts, and determines the emergency avoidance of the blind person, effectively preventing the blind person from failing to respond in a timely or early manner in emergency situations. The present disclosure fully considers the mobility of people indoors and the accidental mobility of obstacles indoors. Based on this, the present disclosure detects the position of the fixed obstacle, plans the initial walking route of the blind person, detects the position data, the speed data, and the acceleration data of people and moving obstacles in various directions indoors, predicts the route of people, and re-plans the walking route of the blind person. The present disclosure guides the blind person to walk at a constant speed under normal circumstances, and guides the blind person to accelerate walking in emergency avoidance situations. In addition, the present disclosure can also adjust the emergency avoidance route of the blind person, effectively preventing the blind person from failing to respond in a timely or early manner in emergency situations.

Finally, it should be noted that the above descriptions are only preferred embodiments of the present disclosure, and are not intended to limit the present disclosure. Although the present disclosure has been described in detail with reference to the foregoing embodiments, those skilled in the art may still modify the technical solutions described in the foregoing embodiments, or equivalently substitute some technical features thereof. Any modifications, equivalent substitutions, improvements, etc. made within the spirit and scope of the present disclosure should be included within the protection scope of the present disclosure.

What is claimed is:

1. An indoor navigation robot for a blind person, comprising a data acquisition module, a central processing module, and an intelligent terminal, wherein the data acquisition module and the intelligent terminal are separately in communication connection with the central processing module; the data acquisition module is configured to acquire position data, speed data, and acceleration data; the central processing module performs data analysis and integration, and the intelligent terminal is configured to perform data reception and transmission and provide instruction information to the blind person;

wherein the data acquisition module establishes a spatial coordinate system and acquires the following data in the spatial coordinate system: position data $(X_{ai}, Y_{ai}, Z_{ai})$ of a fixed obstacle, position data $(X_{bi}, Y_{bi}, Z_{bi})$ of a moving obstacle, position data $(X_{ci}, Y_{ci}, Z_{ci})$ of a pedestrian, position data $(X_{di}, Y_{di}, Z_{di})$ of the blind person, speed data $E_{bi}$ of the moving obstacle, speed data $E_{ci}$ of the pedestrian, speed data $E_{di}$ of the blind person, acceleration data $F_{bi}$ of the moving obstacle, acceleration data $F_{ci}$ of the pedestrian, and acceleration data $F_{di}$ of the blind person, wherein i denotes real-time data, a denotes a representation number of the fixed obstacle, b denotes a representation number of the moving obstacle, c denotes a representation number of the pedestrian, and d denotes a designated representation symbol of the blind person; and the data acquisition module further transmits the acquired data to the central processing module;

wherein the central processing module performs data analysis and integration to acquire the following data:

in case of a same flat surface indoors:

a distance between the fixed obstacle and the blind person: $G_{ai}$, wherein $G_{ai} = \sqrt{(X_{ai}-X_{di})^2 + (Y_{ai}-Y_{di})^2}$;

a distance between the moving obstacle and the blind person: $G_{bi}$, wherein $G_{bi} = \sqrt{(X_{bi}-X_{di})^2 + (Y_{bi}-Y_{di})^2}$; and a distance between the pedestrian and the blind person: $G_{ci}$, wherein $G_{ci} = \sqrt{(X_{ci}-X_{di})_2 + (Y_{ci}-Y_{di})^2}$; and in case of different flat surfaces indoors:

a distance between the fixed obstacle and the blind person: $H_{ai}$, wherein $H_{ai} = \sqrt{(X_{ai}-X_{di})^2 + (Y_{ai}-Y_{ai})^2 + (Z_{ai}-Z_{ai})^2}$;

a distance between the moving obstacle and the blind person: $H_{bi}$, wherein $H_{bi} = \sqrt{(X_{bi}-X_{ai})^2 + (Y_{bi}-Y_{di})^2 + (Z_{bi}-Z_{di})^2}$; and a distance between the pedestrian and the blind person: $H_{ci}$, wherein $H_{ci} = (X_{ci}-X_{di})^2 + (Y_{ci}-Y_{di})^2 + (Z_{ci}-Z_{di})^2$; and a safe distance is set as P, and P is twice a shoulder width of the blind person.

2. The indoor navigation robot for the blind person according to claim 1, wherein the central processing module initially plans a real-time walking route of the blind person according to an initial planning condition to obtain an initially planned real-time walking route, wherein in the initial planning condition, the position data $(X_{di}, Y_{di}, Z_{di})$ of the blind person on the real-time walking route satisfies:

$$P < \min_{a=1,i=1}(G_{ai}) \text{ and } P < \min_{a=1,i=1}(H_{ai}).$$

3. The indoor navigation robot for the blind person according to claim 2, wherein the central processing module secondarily plans the real-time walking route of the blind person based on the initially planned real-time walking route according to a first condition and a second condition; wherein in the first condition, $$P < \min_{b=1,i=1}(G_{bi}), P < \min_{c=1,i=1}(G_{ci}), P < \min_{b=1,i=1}(H_{bi}), \text{ and } P < \min_{c=1,i=1}(H_{ci});$$

in the second condition, when $$2P \geq \min_{b=1,i=1}(G_{bi}), 2P \geq \min_{c=1,i=1}(G_{ci}), 2P \geq \min_{b=1,i=1}(H_{bi}), \text{ and } 2P \geq \min_{c=1,i=1}(H_{ci}),$$

K is calculated; and $$K = \frac{G_{bi+1} - G_{bi}}{G_{bi}} \times \frac{G_{ci+1} - G_{ci}}{G_{ci}} \times \frac{H_{bi+1} - H_{bi}}{H_{bi}} \times \frac{H_{ci+1} - H_{ci}}{H_{ci}};$$

when K≥0, there is no need to prompt the blind person to make emergency avoidance, and the blind person walks along the real-time walking route as planned; and when K<0, the blind person is prompted through the intelligent terminal to make emergency avoidance in advance and adjust the walking speed $E_{di}$ and acceleration $F_{di}$, such that $E_{di}+F_{di} \geq E_{ci}+F_{ci}$ and $E_{di}+F_{di} \geq E_{bi}+F_{bi}$.

4. The indoor navigation robot for the blind person according to claim 3, wherein after adjustment, K is recalculated; when K≥0, the blind person is prompted that the emergency avoidance in advance is correct and the emergency avoidance is supposed to continue; when $$2P < \min_{b=1,i=1}(G_{bi}), 2P < \min_{c=1,i=1}(G_{ci}), 2P < \min_{b=1,i=1}(H_{bi}), \text{ and } 2P < \min_{c=1,i=1}(H_{ci}),$$

the blind person is prompted through the intelligent terminal that the emergency avoidance is successful; when K<0, the blind person is prompted through the intelligent terminal that the emergency avoidance is incorrect and the blind person is supposed to accelerate; and K is recalculated;

K is recalculated; when K≥0, the blind person is prompted through the intelligent terminal that the emergency avoidance in advance is correct and the emergency avoidance is supposed to continue; when $$2P < \min_{b=1,i=1}(G_{bi}), 2P < \min_{c=1,i=1}(G_{ci}), 2P < \min_{b=1,i=1}(H_{bi}), \text{ and } 2P < \min_{c=1,i=1}(H_{ci}),$$

the blind person is prompted through the intelligent terminal that the emergency avoidance is successful and the blind person is supposed to decelerate and walk normally; when K<0, the blind person is prompted through the intelligent terminal that the emergency avoidance is incorrect and the blind person is supposed to turn and walk without changing the walking speed; and K is recalculated; and K is recalculated; when K≥0, the blind person is prompted through the intelligent terminal that the emergency avoidance in advance is correct and the emergency avoidance is supposed to continue; and when $$2P < \min_{b=1,i=1}(G_{bi}), 2P < \min_{c=1,i=1}(G_{ci}), 2P < \min_{b=1,i=1}(H_{bi}), \text{ and } 2P < \min_{c=1,i=1}(H_{ci}),$$

the blind person is prompted through the intelligent terminal that the emergency avoidance is successful and the blind person is supposed to decelerate and walk normally.

5. The indoor navigation robot for the blind person according to claim 1, further comprising a cloud platform, wherein the data acquisition module, the central processing module, and the intelligent terminal are separately in communication connection with the cloud platform; the cloud platform comprises a database, and the cloud platform is configured to perform comprehensive management on data of the indoor navigation robot through a remote cloud; and the database is configured to perform data storage.

6. The indoor navigation robot for the blind person according to claim 1, wherein the data acquisition module comprises a position data acquisition unit, a speed data acquisition unit, an acceleration data acquisition unit, and a video data acquisition unit, wherein the position data acquisition unit is configured to acquire the position data of the fixed obstacle, the position data of the moving obstacle, and the position data of the pedestrian; the speed data acquisition unit is configured to acquire and process the speed data of the moving obstacle and the speed data of the pedestrian; the acceleration data acquisition unit is configured to acquire and process the acceleration data of the moving obstacle and the acceleration data of the pedestrian; and the video data acquisition unit is configured to acquire and process video data around the blind person.

7. The indoor navigation robot for the blind person according to claim 1, wherein the central processing module comprises a data reception and transmission unit, a data integration unit, and a data analysis unit, wherein the data reception and transmission unit is configured to perform data reception and transmission, and to transmit data of the indoor navigation robot and the intelligent terminal; the data integration unit is configured to perform data integration; and the data analysis unit is configured to perform data analysis.

8. The indoor navigation robot for the blind person according to claim 1, wherein the intelligent terminal comprises a voice prompt unit, wherein the voice prompt unit is a bone conduction headphone.

* * * * *